United States Patent Office 2,816,881
Patented Dec. 17, 1957

2,816,881
METHOD OF VULCANIZING A RUBBER IN THE PRESENCE OF AN ACCELERATOR AND THE PRODUCT OBTAINED THEREBY

Frank A. V. Sullivan, Glenbrook, Conn., Edwin O. Hook, Bay Village, Ohio, and Arnold R. Davis, Riverside, Conn., assignors to American Cyanamid Company, New York, N. Y., a corporation of Maine No Drawing. Application July 8, 1955
Serial No. 520,925

3 Claims. (Cl. 260—79.5)

This invention relates to the vulcanization of rubber. More particularly, it relates to a process of vulcanization using a delayed action accelerator and to compositions of matter comprising a delayed action accelerator. Still more particularly, it relates to a process of vulcanizing natural and synthetic rubbers employing as an accelerator 2-benzothiazolyl sulfene-2,6-dimethyl morpholide and to compositions of matter comprising said accelerator.

Many materials have been found to accelerate the rubber vulcanization process. Nevertheless, relatively few of these have become of any commercial importance because they fail in one or more respects to meet certain requirements. One of the requirements of an accelerator is that its accelerating activity be sufficiently "delayed." It is not uncommon, for example, to find materials whose accelerating action is activated during the mixing and calendering operations whereby vulcanization is initiated. Such premature vulcanization is known as "scorching." It is avoided by using an accelerator the activity of which is not immediately initiated at the treating temperature. Such accelerators are known as delayed action accelerators and provide the necessary processing safety required for successful operation of industrial installations. It is also necessary that an accelerator exhibit a very low order of toxicity by either skin or oral exposure. In addition, an accelerator must not have or impart to the final rubber product a disagreeable odor or color.

In accordance with the present invention, it has been found that 2-benzothiazolyl sulfene-2,6-dimethyl morpholide exhibits excellent delayed action, giving outstanding "processing safety" particularly when employed with high pH furnace blacks. At the same time, it is neither objectionable as a skin irritant nor skin sensitizer nor does it possess a disagreeable odor characteristic of other accelerators. Moreover, it imparts little or no discoloration to the final rubber product.

The accelerator of this invention may be employed with natural rubber as well as vulcanizable synthetic rubber-like polymers and copolymers. By synthetic rubber-like polymers and copolymers, as used herein, is meant polymers of butadiene-1,3 and copolymers of butadiene-1,3 with vinyl type monomers copolymerizable with butadiene-1,3, such as acrylonitrile, styrene, acrylamide, and the like.

The amount of accelerator employed may vary according to the particular composition treated. In general, however, the accelerator will range in amount from about 0.05 to 5% on the rubber. Usually, it will range from about 0.4 to about 1.5%. For instance, with natural rubber the amount of accelerator will generally vary from about 0.5 to 0.7%, while with synthetic rubber-like polymers and copolymers, for example, GR–S, the amount will usually be from about 0.8 to about 1%.

To further illustrate the invention, the following examples are provided. These examples are illustrative only and are not intended to be restrictive. Unless otherwise noted, all parts are by weight.

EXAMPLE 1

*Preparation of 2-benzothiazolyl sulfene-2,6-dimethyl morpholide*

83.5 parts of crystalline benzothiazole-2-thiol was added to 345 parts of 2,6-dimethylmorpholine with stirring and the temperature raised to 50° C. after addition was completed to effect complete solution of the benzothiazole-2-thiol. 782 parts of an aqueous sodium hypochlorite solution containing 41 parts by weight of sodium hypochlorite was added dropwise to the solution at 45–50° C. over 1.5 hours, during which the product separated from the aqueous reaction mixture as an oil. The reaction mixture was then stirred for an additional hour, permitting the temperature to fall and the product to crystallize. The product was filtered, washed with water, reslurried in 5% aqueous acetic acid and again separated, washed and dried. The yield of product was 96%, having a M. P. of 95–96° C.

EXAMPLE 2

The accelerator of Example 1 and 2-benzothiazolyl sulfene morpholide, one of the better, commercially available delayed action accelerators, were compounded into compositions having the following base formula:

| Ingredients: | Parts by weight |
|---|---|
| Smoked sheets | 100 |
| F. F. black | 25 |
| HAF black | 25 |
| Zinc oxide | 5 |
| Stearic acid | 2 |
| Pine tar | 3 |
| Phenyl-naphthlamine | 1 |
| B–L–E–25 | 1 |
| Sulfur | 2.25 |
| Accelerator | 0.5 |

Samples of these compositions were treated in a Mooney viscometer at 268° F. to determine the scorch time, while other samples were cured at 141° C. for 30 minutes and tested for tensile strength. The results appear in Table 1.

TABLE 1

| Accelerator | Mooney scorch at 268° F. (min.) | Tensile data | | |
|---|---|---|---|---|
| | | Modulus at elongation of 300% (lbs./in.²) | Tensile strength at break (lbs./in.²) | Elongation at break (percent) |
| 2-benzothiazolyl sulfene morpholide | 18 | 1,475 | 3,700 | 570 |
| 2-benzothiazolyl sulfene-2,6-dimethyl morpholide | 20 | 1,450 | 3,650 | 570 |

The data of Table 1 show that the accelerator of this invention has a longer delayed action than 2-benzothiazole sulfene morpholide and is equivalent thereto in other respects.

EXAMPLE 3

Example 2 was repeated except that the sulfur content was only 1.75 parts while the 2-benzothiazolyl sulfene morpholide and the 2-benzothiazolyl sulfene-2,6-dimethyl morpholide contents were increased to 0.7 and 0.8 parts, respectively. The results appear in Table 2.

TABLE 2

| Accelerator | Mooney scorch at 268° F. (min.) | Tensile data | | |
|---|---|---|---|---|
| | | Modulus at elongation of 300% (lbs./in.²) | Tensile strength at break (lbs./in.²) | Elongation at break (percent) |
| 2-benzothiazolyl sulfene morpholide | 20 | 1,525 | 3,500 | 540 |
| 2-benzothiazolyl sulfene-2,6-dimethyl morpholide | 25 | 1,650 | 3,775 | 560 |

We claim:

1. A method of vulcanizing an elastomer selected from the group consisting of natural rubber, polymers of butadiene-1,3 and copolymers of butadiene-1,3 with vinyl monomers copolymerizable with butadiene-1,3 which comprises: milling together a mixture comprising said elastomer, sulfur and 2-benzothiazolyl sulfene-2,6-dimethyl morpholide and subjecting said mixture to heat for sufficient time to establish the cure of the elastomer.

2. A composition obtained by milling together an unvulcanized, vulcanizable elastomer selected from the group consisting of natural rubber, polymers of butadiene-1,3 and copolymers of butadiene-1,3 with vinyl monomers copolymerizable with butadiene-1,3, sulfur and 2-benzothiazolyl sulfene-2,6-dimethyl morpholide.

3. A cured elastomeric product selected from the group consisting of natural rubber, polymers of butadiene-1,3 and copolymers of butadiene-1,3 with vinyl monomers copolymerizable with butadiene-1,3, which has been vulcanized in the presence of sulfur and 2-benzothiazolyl sulfene-2,6-dimethyl morpholide.

References Cited in the file of this patent
UNITED STATES PATENTS

| Re. 19,286 | Zaucker et al. | Aug. 21, 1934 |
| 2,730,527 | Kinstler | Jan. 10, 1956 |

Notice of Adverse Decision in Interference

In Interference No. 90,734 involving Patent No. 2,816,881, F. A. V. Sullivan, E. O. Hook and A. R. Davis, Method of vulcanizing a rubber in the presence of an accelerator and the product obtained thereby, final judgment adverse to the patentees was rendered Aug. 23, 1962, as to claims 1, 2 and 3.
[*Official Gazette October 16, 1962.*]